(12) United States Patent
Hairsnape et al.

(10) Patent No.: US 12,420,438 B2
(45) Date of Patent: Sep. 23, 2025

(54) MANIPULATOR MODULE

(71) Applicant: Saab Seaeye Limited, Fareham (GB)

(72) Inventors: Daniel James Hairsnape, Fareham (GB); Simon James Veater-Young, Fareham (GB)

(73) Assignee: SAAB SEAEYE LIMITED, Fareham (GB)

( * ) Notice: Subject to any disclaimer, the term of this patent is extended or adjusted under 35 U.S.C. 154(b) by 266 days.

(21) Appl. No.: 18/003,739

(22) PCT Filed: Jun. 29, 2021

(86) PCT No.: PCT/GB2021/051643
§ 371 (c)(1),
(2) Date: Dec. 29, 2022

(87) PCT Pub. No.: WO2022/003339
PCT Pub. Date: Jan. 6, 2022

(65) Prior Publication Data
US 2023/0249366 A1    Aug. 10, 2023

(30) Foreign Application Priority Data
Jun. 30, 2020 (GB) ..................................... 2009984

(51) Int. Cl.
*B25J 19/00*    (2006.01)
*B25J 9/10*    (2006.01)
(Continued)

(52) U.S. Cl.
CPC ......... *B25J 19/0029* (2013.01); *B25J 9/1025* (2013.01); *B25J 9/108* (2013.01);
(Continued)

(58) Field of Classification Search
CPC ...... B25J 19/0029; B25J 9/1025; B25J 9/108; B25J 9/123; B25J 9/126; B25J 15/0253;
(Continued)

(56) References Cited

U.S. PATENT DOCUMENTS 4,188,166 A    2/1980  Moreau et al.
4,506,590 A    3/1985  Miki et al.
(Continued)

FOREIGN PATENT DOCUMENTS

| JP | H08197480 A | 8/1996 |
|---|---|---|
| JP | 5475262 B2 | 4/2014 |
| JP | 2015093329 A | 5/2015 |

OTHER PUBLICATIONS

International Patent Application No. PCT/GB2021/051643, International Search Report and Written Opinion mailed Nov. 5, 2021, 13 pages.
(Continued)

*Primary Examiner* — Kira Nguyen
(74) *Attorney, Agent, or Firm* — Fredrikson & Byron, P.A.

(57) ABSTRACT

A manipulator module (100) comprising: a first housing segment (102) configured to be connected to a manipulator; a second housing segment (104) rotatably coupled to a distal end of the first housing segment (102) such that the second housing segment (104) can rotate about a longitudinal axis relative to the first housing segment (102); a linear actuator (118), wherein a distal end of the linear actuator (118) is configured to be coupled to an end effector; a first electric motor (110) arranged to drive the linear actuator (118) to actuate the end effector; a second electric motor (112) arranged to rotatably drive the second housing segment (104) relative to the first housing segment (102); wherein the linear actuator (118) is arranged to extend from the first
(Continued)

housing segment (102) and through the second housing segment (104).

19 Claims, 4 Drawing Sheets

(51) Int. Cl.
 *B25J 9/12* (2006.01)
 *B25J 15/02* (2006.01)
 *B25J 17/02* (2006.01)
(52) U.S. Cl.
 CPC .............. *B25J 9/123* (2013.01); *B25J 9/126* (2013.01); *B25J 15/0253* (2013.01); *B25J 17/0241* (2013.01); *B25J 19/0004* (2013.01); *G05B 2219/34013* (2013.01); *G05B 2219/39001* (2013.01)
(58) Field of Classification Search
 CPC .............. B25J 17/0241; B25J 19/0004; G05B 2219/39001
 See application file for complete search history.

(56) References Cited

U.S. PATENT DOCUMENTS

| | | | |
|---|---|---|---|
| 5,314,293 | A | 5/1994 | Carlisle et al. |
| 6,477,913 | B1* | 11/2002 | Akeel .................. B25J 19/0079 |
| | | | 901/49 |
| 6,988,651 | B2 | 1/2006 | Stevenson et al. |
| 10,946,527 | B2* | 3/2021 | Pidan .................. B25J 17/0283 |
| 2010/0025383 | A1 | 2/2010 | Tiberghien |
| 2010/0101356 | A1 | 4/2010 | Albin |
| 2013/0273818 | A1* | 10/2013 | Guan .................... B25J 11/0065 |
| | | | 451/340 |
| 2016/0136806 | A1 | 5/2016 | Caveney |
| 2021/0268644 | A1* | 9/2021 | Takagi ...................... B25J 9/06 |
| 2022/0359968 | A1* | 11/2022 | Tessier ...................... H01P 3/06 |
| 2023/0093375 | A1* | 3/2023 | Desjardin ................ F16H 9/24 |

OTHER PUBLICATIONS

GB Patent Application No. 2009984.2, Combined Search and Examination Report under Sections 17 and 18(3) dated Dec. 14, 2020, 5 pages.

* cited by examiner

MANIPULATOR MODULE

RELATED APPLICATIONS

This application is a 35 U.S.C. 371 national phase filing from International Application No. PCT/GB2021/051643, filed Jun. 29, 2021, which claims priority to GB Application No. 2009984.2, filed Jun. 30, 2020, the teachings of which are incorporated herein by reference.

The present invention relates to a manipulator module for a manipulator or robotic arm. In particular, but not exclusively, one or more embodiments of the present invention relate to a purely electromechanical manipulator module which combines the functions of actuating an end effector of a manipulator and rotating the end effector of a manipulator.

A manipulator is a type of robot which is able to replicate certain human movements and functions. In particular, a manipulator can be used to manipulate objects without requiring direct physical contact with the object by an operator. Consequently, manipulators are typically used to perform tasks which are repetitive, too difficult or too dangerous for a human to perform. A manipulator can take the form of a robotic arm which is designed to broadly mimic the functionality and dexterity of a human arm. Hydraulic, pneumatic or electromechanical actuators can be used to move the different parts of the manipulator and the manipulator may consist of multiple articulated joints to allow the desired degrees of freedom.

A manipulator may comprise an end effector, which is designed to interact with the environment. An end effector is generally the final link or module of the manipulator and typically comprises some form of tool for interacting with or manipulating objects in the surrounding environment. There are a number of different types of end effector and end effectors are often interchangeable so that a different end effector can be used for performing a different function.

A known end effector for a manipulator is a gripper. A gripper generally consists of two or more fingers or jaws which are actuated to open and close the fingers or jaws with either a parallel or radial motion. The purpose of the gripper is to secure various objects and allow the robot arm to grip and apply sufficient force to manipulate the object's position.

A manipulator typically has the capability to rotate the gripper mechanism about a certain axis. For example, in the case of many robotic arms, the gripper mechanism can be rotated about the central longitudinal axis of the last segment of the arm structure. In other words, the robotic arm has a joint similar to a human wrist for rotating the gripper. The manipulator allows either a certain extent of rotation, for example, a predetermined number of degrees, or continuous rotation depending on the design.

In known manipulators, the gripper open and close function and the gripper rotate function are often independent and separate stages of the mechanical assembly of the manipulator. As a result, the manipulator has separate rotate and gripper modules and each module has its own actuator or actuators for performing its respective function. The rotate module is proximal to the gripper module so that the gripper module can perform its role as an end effector. Consequently, power and communications cabling for the gripper module must either be routed externally around the assembly or passed internally through the rotate module. However, these known arrangements present a number of problems.

FIG. 1A is a schematic drawing of part of a known manipulator 1 comprising an arm linkage 2, an articulating joint 4, to which the arm linkage 2 is connected, a rotate module 6 and a gripper module 8. The rotate module 6 rotates the gripper module 8 relative to the arm linkage 2. A power and communication cable 9 is routed externally to the manipulator between the arm linkage 2 and the gripper module 8. Whilst this represents a simple way of routing the cable 9, it has the drawback of limiting the extent of possible rotation of the gripper module 8. Another significant drawback of this arrangement is that the external cable 9 is vulnerable to being snagged or damaged. Therefore, this arrangement is unsuitable for rugged or hostile environments and does not permit continuous rotation of the gripper module 8.

FIG. 1B is a schematic drawing of part of another known manipulator 10 having a different arrangement for routing the power and communication cable. The manipulator 10 is similar to that of FIG. 1A and comprises an arm linkage 12, an articulating joint 14, a rotate module 16 and a gripper module 18. However, in manipulator 10 the power and communication cable 19 is routed through the rotate module 16. Routing the cable 19 in this way is more complicated that the arrangement of FIG. 1A. Furthermore, the extent of possible rotation of the gripper module 18 is limited because the cable 19 will twist due to the relative rotation between the rotate module 16 and the arm linkage 12. Even if a very flexible cable were to be used, it will still twist and will eventually reach a limit beyond which it cannot be twisted further without failing or adversely affecting performance. Consequently, continuous rotation of the gripper module 18 is generally not possible in an arrangement in which the power and communication cabling passes through the rotate module 16.

If continuous rotation is desired, then a slip-ring device can be used to transmit power and electrical signals between the manipulator and the rotate and gripper modules. This generally comprises a sliding electrical contact which engages a rotating conductor ring. However, there are drawbacks to using slip-rings in that they can have significant contact resistance and may introduce undesirable levels of electrical noise into the communication signal. Furthermore, the sliding electrical contacts are prone to wear and need to be periodically replaced.

Manipulators which need to achieve a high gripping force and rotation torque, for example, to grip and manipulate relatively heaving objects, have typically used hydraulic actuators because electromechanical actuators having generally not been able to deliver the required force. However, a disadvantage of using hydraulic actuators is that they are relatively large and heavy items of equipment requiring a hydraulic pump for power. Furthermore, hydraulic cabling generally has to be routed externally, increasing the risk of snagging or damage to the manipulator. In addition, there are environmental and safety risks associated with the use of high pressure hydraulic fluid, in particular, the risk of fluid leaks from the manipulator.

The present invention has been devised with the foregoing in mind.

According to a first aspect of the present invention, there is provided a manipulator module comprising: a first housing segment configured to be connected to a manipulator; a second housing segment rotatably coupled to a distal end of the first housing segment such that the second housing segment can rotate about a longitudinal axis relative to the first housing segment; a linear actuator, wherein a distal end of the linear actuator is configured to be coupled to an end effector; a first electric motor arranged to drive the linear actuator to actuate the end effector; a second electric motor arranged to rotatably drive the second housing segment relative to the first housing segment; wherein the linear actuator is arranged to extend from the first housing segment and through the second housing segment.

Advantageously, providing a linear actuator which extends from the first housing segment and through the second housing segment means that an end effector can be actuated from the first housing segment. It is not necessary for the second housing segment or the end effector to comprise an actuator for the end effector. Accordingly, there is no need to route power and communication cabling for an end effector actuator from the first housing segment to the second housing segment or to the end effector. This avoids problems with limited rotation due to cable twisting caused by relative rotation between the first housing segment and the second housing segment. The manipulator module also advantageously avoids the need for any external power or communication cabling, which helps to reduce problems caused by cable snagging and entanglement. The above arrangement also avoids the need for a slip-ring connection and contributes to a compact design for the manipulator module. Due to the absence of internal or external cabling running between the first and second housing segments, the second housing segment is able to rotate continuously relative to the first housing segment.

Providing a separate electric motor for respectively driving the linear actuator and rotatably driving the second housing segment means that the mechanisms for performing the rotation and end effector functions of the manipulator module can be mechanically isolated from each other. Furthermore, the rotation and end effector functions of the manipulator module can be operated both independently and in unison.

As used herein, the term "manipulator module" refers to a modular element or subassembly for a manipulator. A manipulator module can be connected or attached to a manipulator such as a robotic arm to provide the manipulator with certain functionality.

The terms "distal" and "proximal" are used herein to describe the relative positions of components of the manipulator module. A manipulator module according to the present invention has a proximal end which can be connected to a manipulator and a distal end which can be connected to an end effector.

As used herein, the term "longitudinal axis" refers to an axis parallel to the length of the manipulator module.

As used herein, the term "linear actuator" refers to an actuator which generates movement in a straight line or along an axis.

The linear actuator may extend along a central longitudinal axis of the first and second housing segments. This arrangement means that the second housing segment can easily rotate about the linear actuator which extends from the first housing segment and through the second housing segment.

The linear actuator may extend to a distal end of the second housing segment. The linear actuator may extend beyond a distal end of the second housing segment.

The second electric motor may be an annular electric motor and the linear actuator may extend through a central opening in the second electric motor. The second electric motor may comprise an annular stator and an annular rotor arranged concentrically and at least partially within the annular stator. The linear actuator may extend through a central opening in the annular rotor of the second electric motor. The second electric motor may be arranged distal to the first electric motor.

The first and second electric motors may be located within the first housing segment. An advantage of this arrangement compared to locating the second electric motor in the second housing segment is that both the first and second electric motors, included all connections to and from the first and second electric motors, are located within the same housing segment. There is no need to route a power cable for an electric motor to the second housing segment. This arrangement avoids problems with limited rotation due to cable twisting caused by relative rotation between the first housing segment and the second housing segment.

The stators of the first and second electric motors may be fixedly attached to an internal surface of the first housing segment The manipulator module may further comprise a linear position sensor for determining the linear position of the linear actuator. The linear position sensor may be an electrical sensor that can be used to provide an electrical signal indicative of the linear position of the linear actuator. The electrical signal can be used in the control of the manipulator module. The linear position sensor therefore helps to achieve accurate and repeatable end effector positioning. Preferably, the linear position sensor is a linear variable differential transformer (LVDT) sensor.

The linear actuator may comprise a roller screw. The roller screw may comprise a screw shaft and a nut which receives and drives the screw shaft. A distal end of the screw shaft may be coupled to the end effector. The roller screw may comprise a plurality of satellite rollers arranged between the screw shaft and the nut. The first electric motor may be coupled to the nut of the roller screw to drive the roller screw. The roller screw converts the rotational motion of the first electric motor into linear motion of the screw shaft. Other types of linear actuator may be used. However, the inventors have found that a roller screw offers improved performance over other types of linear actuator in that it is able to handle heavy loads with high speed and precision. It is also exhibits less friction and wear than other types of linear actuator, thereby increasing its lifespan and efficiency and reducing the need for maintenance.

The use of a roller screw helps to achieve a force comparable to that achievable by a hydraulic actuator of similar size. The force that can be exerted or the dynamic load which can be handled is dependent on the dimensions of the roller screw, for example, the diameter of the screw shaft. However, with a screw shaft diameter of only 10 millimetres, a linear force of 11.3 kilonewtons is possible. In addition, the roller screw's precision helps to achieve accurate and repeatable end effector positioning.

The first electric motor may be an annular electric motor. The first electric motor may comprise an annular stator and an annular rotor arranged concentrically and at least partially within the annular stator. The annular rotor of the first electric motor may be coupled to the linear actuator. Preferably, the annular rotor of the first electric motor may be coupled to the nut of a roller screw to drive the roller screw.

Optionally, the linear actuator may have an internal passage extending along a portion of its length. The linear position sensor may comprise a fixed end attached to the first housing segment and a moveable sensing end. The moveable sensing end of the linear position sensor may be received within the internal passage and abut a blind end of the passage such that the linear position of the sensing end moves with the position of the linear actuator. This arrangement helps to provide a compact and direct method of determining the linear position of the linear actuator. Furthermore, any electrical connections to the linear position sensor for receiving an electrical signal from the linear position sensor are made to its fixed end which is attached to the first housing segment. Therefore, even though the linear actuator extends through the second housing segment, all connections to the linear position sensor can be made from the first housing segment. There is no need to run communication cabling for the electrical signal between the first and second housing segments. It will be appreciated that other suitable types and arrangements of linear position sensor may be used.

The manipulator module may be configured such that the linear actuator is able to fully actuate an end effector with a length of travel of the linear actuator of less than 50 millimetres, preferably less than 40 millimetres and more preferably less than 30 millimetres. The linear actuator may have a length of travel of approximately 20 millimetres for fully actuating an end effector. This helps to provide a compact design and reduce the length of the linear actuator. It also helps to improve the stiffness and reduces flexion and bending moments in the linear actuator.

A proximal end of the linear actuator may be contained within the first housing segment. The first housing provides a firm attachment from where the linear actuator can extend and helps to protect the proximal end of the linear actuator. It also provides a more compact design compared to arrangements in which a proximal end of the linear actuator extends out from a proximal end of the manipulator module. This also helps to simplify attachment to a manipulator.

A proximal end of the linear actuator may not travel beyond a proximal end of the first housing segment. In particular, a proximal end of the screw shaft of the linear actuator does not travel beyond a proximal end of the first housing segment. This protects the linear actuator and its components by containing the movement of the linear actuator within the manipulator and helps to simplify attachment to a manipulator.

The manipulator module may further comprise thrust bearings arranged to support an axial load imparted by the linear actuator. The thrust bearings may be located within the second housing segment. The axial loads generated by the linear actuator are very high compared to the size of the manipulator module. By locating the thrust bearings within the second housing segment the axial load generated by the linear actuator is not transmitted across the bearing about which the second housing segment rotates or another bearing that has to move when the second housing segment rotates. This helps to inhibit compression of the bearings about which the second housing segment rotates so that the second housing segment can rotate more easily with less torque. It also helps to reduce friction and wear in the rotation bearings.

The thrust bearings may be arranged circumferentially around and adjacent to the linear actuator. This helps to support the linear actuator and the loads it imparts. Arranging the thrust bearing adjacent to the linear actuator helps the thrust bearing to more directly counteract the axial load imparted by the linear actuator and to reduce bending moments on the thrust bearings and linear actuator compared to an arrangement in which the bearings are located radially further from an actuator. It also helps to produce a more compact design.

The manipulator module may further comprise a rotary position sensor for determining the rotary or angular position of the second housing segment relative to the first housing segment. The rotary position sensor may be an electrical sensor that can be used to provide an electrical signal indicative of the rotary position of the linear actuator which can be used in the control of the manipulator module. The rotary position sensor therefore helps to achieve accurate and repeatable rotational positioning.

The rotary position sensor may be located within the first housing segment. As a result, all electrical connects to the rotary position sensor for receiving an electrical signal from the rotary position sensor can be made within the first housing segment. There is no need to run communication cabling for the electrical signal between the first and second housing segments.

The rotary position sensor may comprise a rotary encoder. The rotary encoder may comprise an encoder rotor fixedly coupled to the linear actuator and an encoder stator fixedly coupled to the first housing segment. When an end effector is connected to the second housing segment of the manipulator module, the linear actuator is coupled to the end effector and rotates with the end effector and the second housing segment. Therefore, by fixedly coupling the encoder rotor to the linear actuator, the rotary encoder is able to determine the rotary or angular position of the second housing segment relative to the first housing segment. The encoder rotor may be fixedly coupled to a proximal end of the linear actuator.

The manipulator module may further comprise a controller configured to control the supply of electrical power from a power source to the first and second motors.

Alternatively, the controller may be located outside the manipulator module, for example, in a manipulator or robotic arm and communication cabling may pass signals between the controller and first and second electric motors.

Optionally, the controller may be further configured to activate the first electric motor to automatically compensate for linear movement of the linear actuator caused by rotation of the second housing segment and end effector relative to the first housing segment. As discussed above, when an end effector is connected to the second housing segment of the manipulator module, the linear actuator is coupled to the end effector and rotates with the end effector and the second housing segment. If the second electric motor is activated to rotatably drive the second housing element whilst the first electric motor is static, the linear actuator will be rotated relative to the first electric motor which will cause undesired linear movement of the linear actuator and consequently undesired actuation of the end effector.

In the case where the linear actuator comprises a roller screw, activation of the second electric motor to rotatably drive the second housing element whilst the first electric motor is static will result in the screw shaft being rotated relative to the nut which is coupled to the static rotor of the first electric motor. This will cause undesired linear movement of the screw shaft and consequently undesired actuation of the end effector. If the end effector is a gripper, this undesired linear movement may result in the gripping force being undesirably increased or decreased possibly causing the gripper to respectively damage the object it is gripping or lose its grip on an object.

However, the controller allows the manipulator module to automatically compensate for this linear movement. The controller is able to activate the first electric motor to drive the linear actuator and correct for any difference between the desired linear position of the linear actuator and the actual linear position resulting from rotation of the second housing segment relative to the first housing segment.

The controller may be configured to activate the first electric motor to automatically compensate for linear movement of the linear actuator caused by rotation of the second housing segment in response to a signal received from the linear position sensor. The linear position sensor is able to accurately feedback a signal to the controller, which signal is indicative of the linear position of the linear actuator. Based on this signal, the controller can activate the first electric motor to drive the linear actuator and correct for any difference between the desired linear position of the linear actuator and the actual linear position resulting from rotation of the second housing segment relative to the first housing segment.

The controller may be configured to drive the first electric motor to maintain the linear actuator in a constant linear position. The controller may be configured to drive the first electric motor at the same time as the second housing segment is being rotated to maintain the linear actuator in a constant linear position. By driving the first electric motor at the same time as the second housing segment is being rotated, no appreciable change in the linear of position of the linear actuator arises because the controller is compensating for the rotation of the second housing segment as it occurs. This allows the manipulator module to maintain an end effector in a constant position. For example, in the case where the end effector is a pair of actuatable jaws, the controller allows the manipulator module to maintain the jaws in a constant opening position.

The controller may be configured to drive the first electric motor to maintain the current delivered to the first electric motor at a predefined current limit. The controller may be configured to drive the first electric motor at the same time as the second housing segment is being rotated so that the controller can maintain the electrical current being delivered to the first electric motor at a predefined current limit. By driving the first electric motor at the same time as the second housing segment is being rotated, no appreciable or significant change in the electrical current being delivered to the first electric motor to provide a particular force is required because the controller is compensating for the rotation of the second housing segment as it occurs. This allows the linear actuator to transmit a constant force to an end effector such that the end effector can apply a constant force to an object it is manipulating.

The manipulator module may further comprise a current sensor for determining the electrical current being delivered to the first electric motor. Any suitable current sensor may be used. The current sensor provides an accurate indication of the electrical current being delivered to the first electric motor and therefore the force being applied by the linear actuator. The controller may be configured to drive the first electric motor in response to a feedback signal received from the current sensor.

The controller may comprise a microprocessor. The controller may be a programmable microprocessor, a microcontroller, or an application specific integrated chip (ASIC) or other electronic circuitry capable of providing control. The controller may further comprise motor controller circuitry.

The manipulator module may further comprise an electromagnetic brake arranged to resist rotation of the second housing segment when electrical power is not being supplied to the manipulator module. For example, when electrical power to the manipulator module is switched off or there is an electrical power failure due to a malfunction, the electromagnetic brake engages and provides a holding torque which prevents any back-driving of the second housing segment under normal external loads. This prevents the second housing segment from being overloaded when electrical power is not available.

Optionally, the electromagnetic brake may be configured to slip when a threshold holding torque is exceeded. This allows the second housing segment to back-drive under excessive external loads.

The electromagnetic brake may be located within the first housing segment. This avoids the need to route power and communication cabling from the first housing segment to the segment housing segment to power and control the electromagnetic brake.

Optionally, the electromagnetic brake may comprise a brake stator fixedly coupled to the first housing segment and a friction disk hub coupled to the rotor of the second motor. This arrangement allows the friction disk hub to resist rotation of the second motor and therefore resist rotation of the second housing segment. When electrical power is applied to the electromagnetic brake, it releases the holding torque on the brake friction disk hub allowing the rotor of the second electric motor to rotate freely. When power is not being supplied, the electromagnetic brake engages the holding torque on the brake friction disk hub preventing any back driving of the second electric motor and second housing segment under normal external loads.

The manipulator module may further comprise a gear system for transmitting rotational movement between the second electric motor and the second housing segment. Optionally, the gear system is a reduction gear system. The reduction gear system reduces the relatively high speed of the second electric motor to drive the second housing segment at a lower speed and increase the torque delivered by the second housing segment. The reduction ratio or gear ratio of the gear system may be at least 10:1 and more particularly at least 50:1. Preferably, the reduction ratio of the gear system is about 80:1. The reduction ratio of the gear system may be 100:1 or more. The output torque of the gear system may be more than 200 newton-metres, preferably more than 250 newton-metres and yet more preferably more than 300 newton-metres.

The gear system may comprise a gear input coupled to the rotor of the second electric motor and a gear output coupled to the second housing segment. The gear system may comprise a gear housing or gearbox. The gear housing may be fixedly coupled to the first housing segment. The gear output may protrude from a distal end of the first housing segment to provide a bearing support for the second housing segment.

The linear actuator may be arranged to extend through the gear system. The gear system may be an annular gear system and the linear actuator may be arranged to extend through a central opening in the gear system. The gear system may comprise an annular gear housing, an annular input hub and an annular output hub.

Optionally, the gear system may comprise a strain wave gear system. The inventors have found that strain wave gear systems offer a number of advantages for a manipulator module over other gear systems. For example, they are relatively compact and lightweight, they can achieve high gear ratios and therefore have high torque capability and they are capable of precise angular movement with good repeatability when manipulating inertial loads. Furthermore, strain wave gear systems exhibit no backlash, that is lost motion in the mechanism of the gear system caused by gaps between interlocking components. The use of a strain wave gear system therefore helps to achieve a high rotational torque for rotating the end effector with accurate and repeatable rotational positioning. For example, the strain wave gear system can achieve an output torque of 330 newton-metres or more.

The manipulator module may further comprise an end effector. The end effector may be a gripper. It will be appreciated that other suitable end effectors may be used.

An interior of the manipulator module may be filled with oil. Preferably, the interior of the first and second housing segments may be filled with oil. This inhibits the ingress of water and moisture into the manipulator module, protecting the components arranged within the interior of the manipulator module. Furthermore, it helps to lubricate the moving components of the manipulator module.

The manipulator module may be sealed. This helps to inhibit the ingress of moisture, water and particulate matter particularly when operating in inhospitable environments. A seal may be arranged in the region where the second housing segment is rotatably coupled to the first housing segment. A seal may be arranged around the linear actuator at the distal end of the second housing segment.

According to a second aspect of the present invention, there is provided a manipulator module comprising: a first housing segment configured to be connected to a manipulator; a second housing segment rotatably coupled to a distal end of the first housing segment such that the second housing segment can rotate about a longitudinal axis relative to the first housing segment, wherein a distal end of the second housing second is configured to be coupled to an end effector; a linear actuator, wherein a distal end of the linear actuator is configured to be coupled to the end effector; a first electric motor arranged to drive the linear actuator to actuate the end effector; a second electric motor arranged to rotatably drive the second housing segment relative to the first housing segment; and a controller, wherein the controller is configured to activate the first electric motor to compensate for linear movement of the linear actuator caused by relative rotation of the second housing segment.

The second aspect of the present invention may comprise any of the additional features described above in respect of the first aspect.

According to a third aspect of the present invention, there is provided a manipulator comprising at least one moveable linkage and any of the manipulator modules described above, wherein the manipulator module is connected to the moveable linkage.

The manipulator may further comprise an end effector. The end effector may be connected to a distal end of the second housing segment of the manipulator module such that the end effector is rotated with the second housing segment.

The end effector may be releasably coupled to the linear actuator of the manipulator module by a single fastener. This allows the end effector to be simply and quickly attached to, and detached from, the linear actuator. This helps to reduce the time taken to change the end effector. Furthermore, the use of a fastener avoids the need to use other conventional methods of coupling end effectors to manipulators such as a splines and avoids the manufacturing complexity involved in producing a screw shaft with a thread and a spline. In addition, using a fastener instead of a spline avoids the reduction in load capacity of the screw shaft which results from forming the screw shaft with a spline, which in turn reduces the maximum end effector force which can be exerted by the linear actuator.

According to a fourth aspect of the present invention, there is provided an end effector for a manipulator module as described above, wherein the end effector can be releasably coupled to a linear actuator of the manipulator module by a single fastener. This has the benefits discussed above with respect to the use of a single fastener to couple the end effector to the linear actuator.

According to a fifth aspect of the present invention, there is provided a kit of parts comprising: a manipulator assembly comprising as least one moveable linkage; a manipulator module as described above; and a plurality of interchangeable end effectors connectable to a distal end of the second housing segment of the manipulator module.

According to a sixth aspect of the present invention, there is provided a remotely operated vehicle comprising a manipulator module as described above.

Features described in relation to one or more aspects of the present invention may equally be applied to other aspects of the invention.

Embodiments of the invention will now be described, by way of example only, with reference to the accompanying drawings, in which.

Figure 1A:
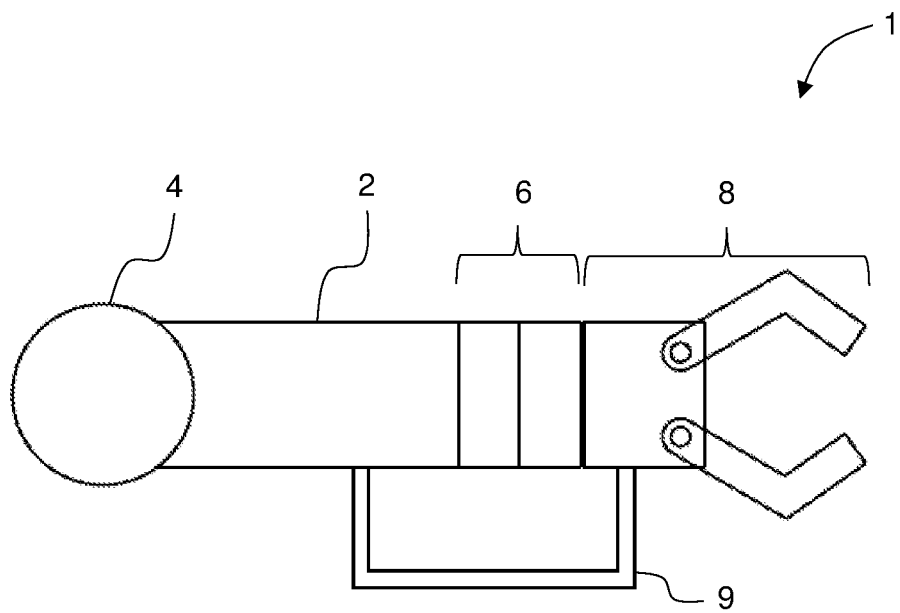
FIGS. 1A and 1B are schematic drawings of two prior art manipulators showing known arrangements for routing power and communication cabling.
Figure 1B:
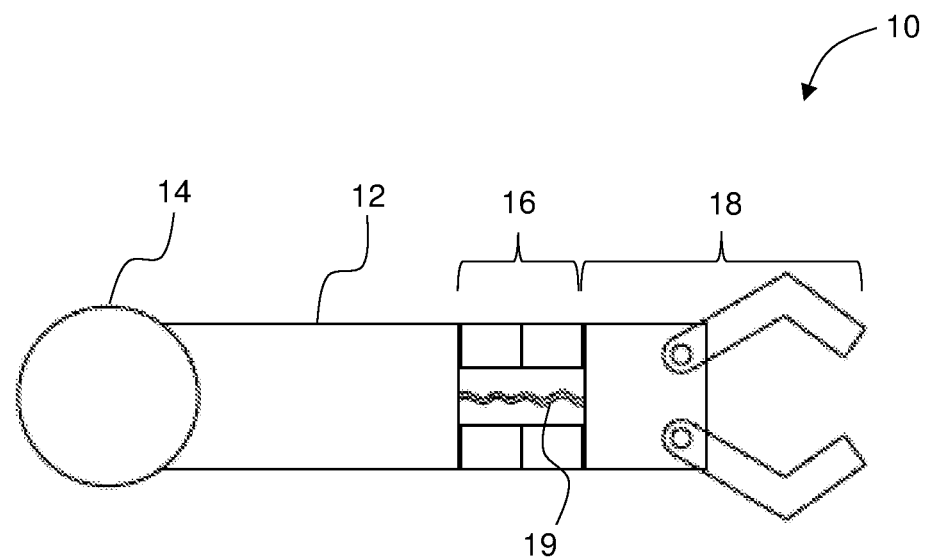
Figure 2:
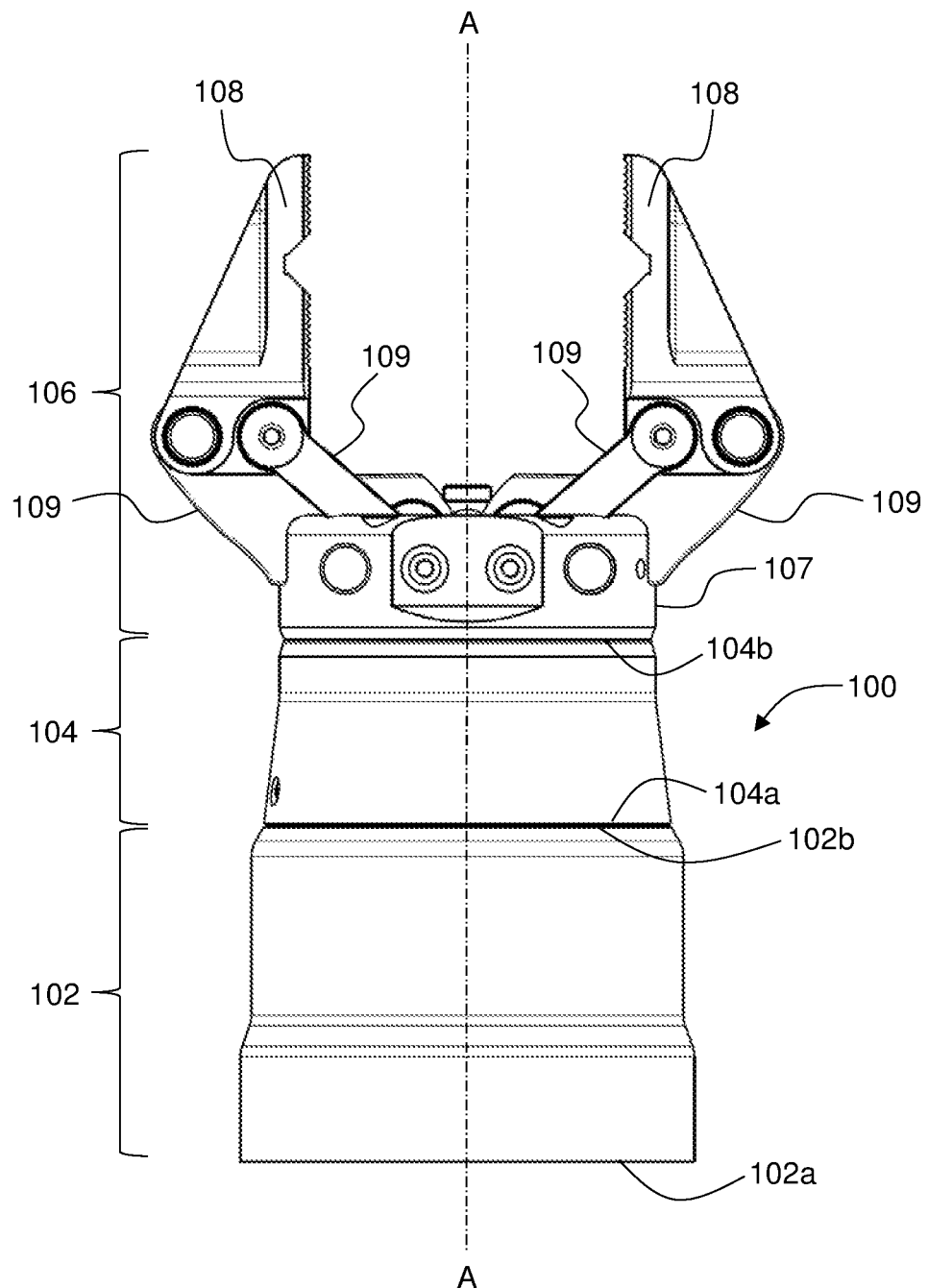
FIG. 2 is a plan view of a manipulator module according to an embodiment of the present invention with an end effector attached to a distal end of the manipulator module.

Referring to FIG. 2, there is shown a manipulator module 100 comprising a first housing segment 102 and a second housing segment 104. A proximal end 102a of the first housing segment 102 is configured to be connected to the distal end of a manipulator or robotic arm (not shown). The first housing segment 102 does not rotate. A proximal end 104a of the second housing segment 104 is rotatably coupled to a distal end 102b of the first housing segment 102 and can rotate about a longitudinal axis A-A of the manipulator module 100 relative to the first housing segment 102.

An end effector 106 is releasably attached to a distal end 104b of the second housing segment 104. In FIG. 2, the end effector 106 is a gripper having a pair of jaws 108 pivotally connected to jaw levers 109, which jaw levers 109 are in turn pivotally connected to an attachment member 107. Rotary motion of the jaw levers 109 causes the jaws 108 to open or closed with a parallel motion. If desired, the end effector 106 can be removed from the second housing segment 104 and replaced with a different end effector which performs a different function.

The first housing segment 102 is preferably made from metal and provides a solid structure to mount all internal components accurately and in alignment. It protects the internal components from the environment and interfaces with the structure of the manipulator or robotic arm. The second housing segment 104 is also preferably made from metal and provides a solid structure for mounting the attachment member 107 and pivot points for the end effector 106. The attachment member 107 for the end effector 106 is attached to the second housing segment 104 by a plurality of fasteners (not shown).

Figure 3:
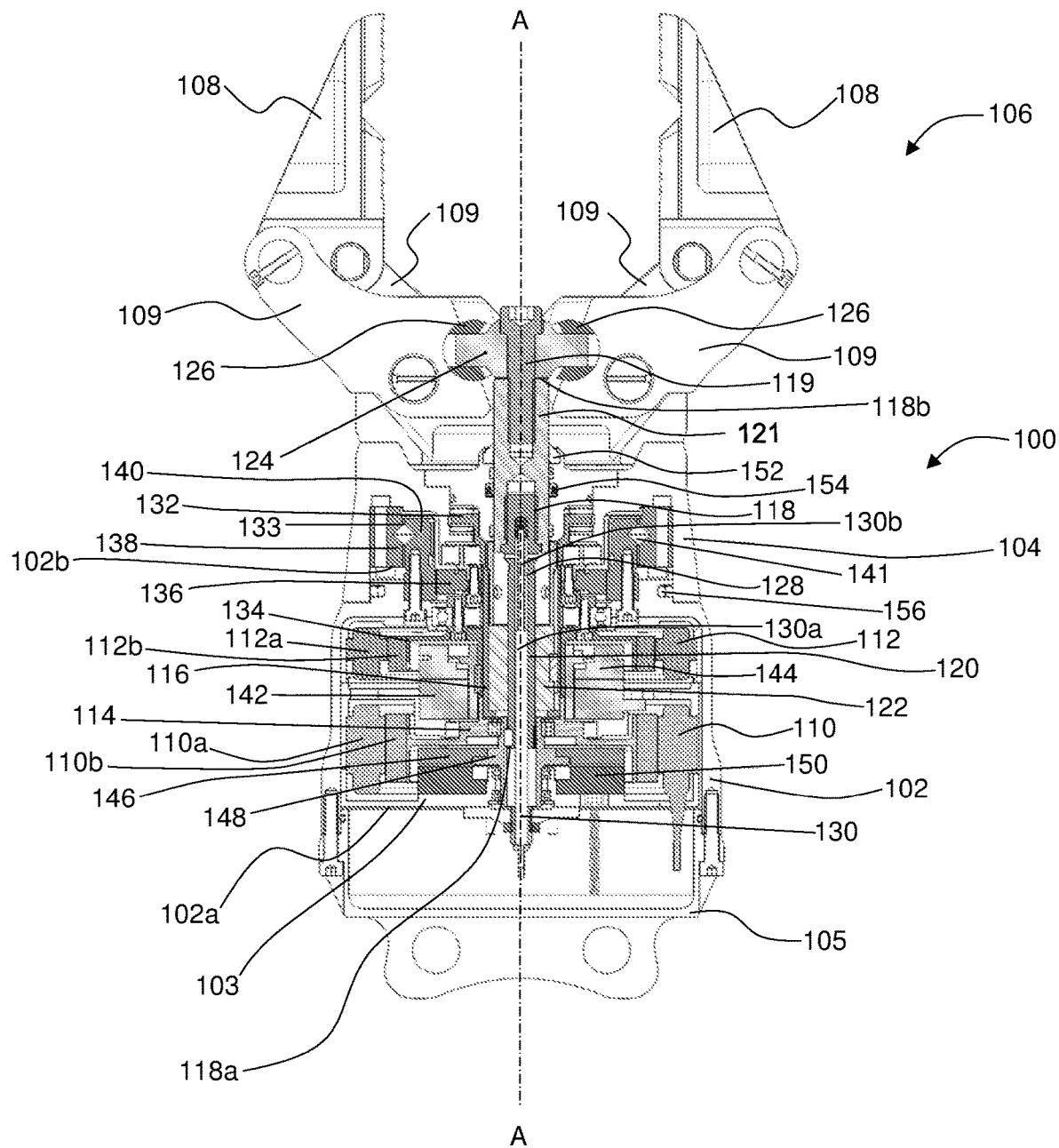
FIG. 3 is a longitudinal cross-sectional view of the manipulator module of FIG. 2.

FIG. 3 shows a longitudinal cross-sectional view of the manipulator module 100 of FIG. 2. The manipulator module 100 of FIG. 3 is essentially the same as that of FIG. 2 with the exception that an additional housing component 105 is attached to the proximal end 102a of the first housing segment 102 for connection to a manipulator or robotic arm.

The first 102 and second 104 housing segments are substantially hollow and are open at their proximal ends 102a, 104a and closed at their distal ends 102b, 104b. A central opening is formed in each of their distal ends 102b, 104b through which a linear actuator 118 extends. The linear actuator 118 extends from the first housing segment 102 through the second housing segment 104 to the end effector 106 along a central longitudinal axis A-A of the manipulator module 100. The proximal end 102a of the first housing segment 102 is closed by a backplate 103.

The interior of the first housing segment 102 defines an internal cavity within which is located a first electric motor 110 and a second electric motor 112. The first electric motor 110 is an annular electric motor and comprises a first annular stator 110a and a first annular rotor 110b arranged concentrically within the first annular stator 110a. The first annular stator 110a is fixedly coupled or attached to an internal surface of the first housing segment 102 to prevent rotation of the first annular stator 110a due to motor reaction torque. The first electric motor 110 drives the linear actuator 118 to actuate the end effector 106.

In the example of FIG. 3, the linear actuator 118 is a roller screw comprising a screw shaft or lead screw 120, a plurality of satellite or planetary rollers (not shown) arranged around the screw shaft 120 and a nut 122 which encapsulates the satellite rollers. The screw shaft 120 has an external thread, which engages and cooperates with a thread on each of the satellite rollers, which in turn engages and cooperates with an internal thread on the nut 122. Rotation of the nut 122 results in linear movement of the screw shaft 120. The satellite rollers provide a low-friction transmission between the screw shaft 120 and the nut 122 and allow high speed and high precision positioning of the screw shaft 120. Furthermore, the satellite rollers provide more bearing points than conventional leadscrew based linear actuators and therefore can achieve high dynamic load ratings. The roller screw linear actuator 118 therefore helps to transmit a high linear force, for example, up to 11.3 kilonewtons to the end effector 106 with accurate and repeatable end effector positioning.

The first annular rotor 110b of the first electric motor 110 defines a central opening within which is received a first rotor hub 114. The first rotor hub 114 is supported on ball bearings which are fixed to the first housing segment 102. The first annular rotor 110b is coupled to the first rotor hub 114, which in turn is coupled to a drive tube 116 which is arranged around the nut 122. The drive tube 116 is keyed into and is supported by the first rotor hub 114 so that the first rotor hub 114 can transfer torque to the drive tube 116 which turns with the first rotor hub 114. The nut 122 is keyed and clamped into the drive tube 116 so that the drive tube 116 can transfer torque to the nut 122. The nut 122 converts the rotational torque of the first electric motor 110 into a linear force by acting on the thread of the screw shaft 120. Thus, the first electric motor 110 is able to drive the linear actuator 118.

By activating the first electric motor 110, the linear or axial position of the screw shaft 120 of the linear actuator 118 can be varied. A piston rod 121 is attached as part of the linear actuator 118 to a distal end of the screw shaft 120. The piston rod 121 increases the length of the linear actuator 118 such that the linear actuator extends beyond a distal end of the second housing segment 104. A distal end of the piston rod 121, corresponding to a distal end 118b of the linear actuator 118, is coupled to the jaw levers 109 of the end effector 106 by a cross-pin 124. The cross-pin 124 is keyed to the distal end 118b of the piston rod 121 preventing any relative rotation between the end effector 118 and the linear actuator 118. A single bolt 119 is used to attach the cross-pin 124 to the distal end of the piston rod 121. Using a single bolt 119 helps improve the speed and ease with which the end effector 106 can be attached to and detached from the linear actuator 118 and contributes to reduced change-over times for the end-effector 106. The cross-pin 124 slides into opposing bushings 126 mounted in the jaw levers 109. The bushings 126 distribute the linear motion of the linear actuator 118 equally between the jaw levers 109 resulting in rotary motion of the jaw levers 109 about their pivot points. The axial position of the screw shaft 120 of the linear actuator 118 directly controls the opening distance between the end effector jaws 108.

The screw shaft 120 of the linear actuator 118 has a central internal passage 128 extending along a portion of its length. The internal passage 128 is open at a proximal end 118a of the linear actuator 118 and is closed or blind at its opposing end. A linear position sensor 130 for determining the linear position of the linear actuator is inserted into the internal passage 128. The linear position sensor 130 is a linear variable differential transformer (LVDT) sensor and comprises a body 130a and a moveable rod 130b which travels into and out of the body 130a. A proximal fixed end of the body 130a of the linear position sensor 130 is attached to the backplate 103 at a proximal end 102a of the first housing segment 102. A sensing end of the linear position sensor 130 located at a distal end of the moveable rod 130b is received within the internal passage 128 and abuts the closed end of the internal passage 128. The moveable sensing end of the linear position sensor 130 is resiliently biased towards the closed end of the internal passage 128 by a spring so that the moveable sensing end remains in continual contact with, and moves with, the closed end of the internal passage 128 of the screw shaft 120. The screw shaft 120 slides over the body 130a of the linear position sensor 130 as the screw shaft moves backwards and forwards. The linear position sensor 130 has connections at its proximal fixed end for outputting an electrical signal, which signal is indicative of the linear position of the screw shaft 120 of the linear actuator 118.

The manipulator module is further equipped with thrust bearings 132 which react against the linear force provided by the linear actuator 118. The thrust bearings 132 are arranged between the drive tube 116 and the and the second housing segment 104. The thrust bearings 132 fix the axial position of the drive tube 116 while still allowing the drive tube 116 to rotate freely under load.

The second electric motor 112 is also an annular electric motor and comprises a second annular stator 112a and a second annular rotor 112b arranged concentrically within the second annular stator 112a. The second annular stator 112a is fixedly coupled or attached to an internal surface of the first housing segment 102 to prevent rotation of the second annular stator 112a due to motor reaction torque.

The second annular rotor 112b of the second electric motor 112 defines a central opening through which the linear actuator 118 extends. A second rotor hub 134 is received within the central opening and is coupled to the second annular rotor 112b. The second rotor hub 134 also has a central opening through which the linear actuator 118 extends. The second rotor hub 134 is supported on ball bearings which are fixed to the first housing segment 102.

The manipulator module 100 further comprises a strain wave gear system or gearbox 133. The strain wave gear system 133 is annular and comprises an annular input hub 136, an annular output hub 138 and an annular gear housing 140. The linear actuator 118 passes through a central opening in the annular strain wave gear system 133. The second rotor hub 134 is coupled to the input hub 136 of the strain wave gear system 133 and transmits torque from the second annular rotor 112b of the second electric motor 112 to the input hub 136 of the strain wave gear system 133. Strain wave gear systems are known and, for conciseness, a detailed description of their operation is not included here. They typically comprise three main gear components: an elliptical wave generator (not shown), a flexible spline (not shown) and a rigid circular spline (not shown). The input hub 136 of the strain wave gear system 133 is coupled to the wave generator of the strain wave gear system 133 and an output hub 138 of the strain wave gear system 133 is coupled to the flexible spline of the strain wave gear system 133. A gear housing 140 of the strain wave gear system 133 is fixedly attached to the first housing segment 102. The reduction gear ratio of the strain wave gear system 133 is 80:1 which is relatively high compared to other gear systems such as epicyclic gears. The strain wave gear system 133 therefore exhibits high torque capacity. The strain wave gear system 133 also exhibits improved efficiency and stiffness compared to other types of gear system and no backlash. A crossed-roller bearing 141 is integrated into the strain wave gear system 133 which allows it to handle both radial thrust and moment loads simultaneously.

The output hub 138 of the strain wave gear system 133 is fixedly coupled to the second housing segment 104. Thus, the second electric motor 112 is arranged to rotatably drive the second housing segment 104 relative to the first housing segment 102. The strain wave gear system 133 converts the high speed low torque motion of the second electric motor 112 to high torque low speed motion of the second housing segment 104. The output hub 138 of the strain wave gear system protrudes from the distal end 102b of the first housing segment 102 and provides a bearing support for the second housing segment 104.

The manipulator module 100 employs an electromagnetic brake arranged to resist rotation of the second housing segment 104 when electrical power is not being supplied to the manipulator module 100, for example, when power is switched off or there is a power failure. The electromagnetic brake comprises a brake stator 142, which is fixedly attached to the first housing segment 102, and a friction disk hub 144, which is keyed to the second rotor hub 134. The second rotor hub 134 is coupled to the input hub 136 of the strain wave gear system and the output hub 138 of the strain wave gear system is coupled to the second housing segment 104.

When electrical power is being supplied to the manipulator module 100, the electromagnetic brake coils are energised and release any clamping force from the friction disk hub 144 allowing the second rotor hub 134 to rotate freely. When power is not being supplied to the manipulator module 100, the electromagnetic brake coils are not energised and apply a clamping force to the friction disk hub 144 causing the electromagnetic brake to engage and resist rotation of the second rotor hub 134. The electromagnetic brake prevents any back-driving of the second housing segment 104 under normal external loads. To prevent the joint between the first and second housing segments from being overloaded, the electromagnetic brake's holding torque is set to slip at a predefined limit or threshold, allowing the second housing segment to back-drive under excessive loads.

The manipulator module 100 also comprises a rotary encoder which acts as a rotary position sensor for determining the rotary or angular position of the second housing segment 104 relative to the first housing segment 102. The rotary encoder comprises an encoder rotor 146, which is fixedly mounted on an encoder rotor hub 148, and an encoder stator 150, which is fixedly attached to the first housing segment 102. The encoder rotor hub 148 is supported on ball bearings which are fixed to the first housing segment 102. The encoder rotor hub 148 is keyed to the proximal end of the screw shaft 120 of the linear actuator.

As mentioned above, the cross-pin 124 is keyed to the distal end 118b of the linear actuator 118 preventing any relative rotation between the end effector 118 and the linear actuator 118. Therefore, when the second housing segment 104 rotates the end effector 106, the screw shaft 120 of the linear actuator 118 will be rotated to the same degree. The screw shaft 120 transfers the rotary position of the end effector 106 to the encoder rotor 146 via the encoder rotor hub 148. The rotary position of the screw shaft 120 is constrained to the encoder rotor hub 148 with a keyway or spline but the axial position of the screw shaft is unconstrained and it can freely slide in and out of the rotor encoder hub 148 as the jaws 108 of the end effector 106 are opened and closed.

The encoder rotor 146 is a passive component. Rotary movement of the encoder rotor 146 is detected by the encoder stator 150. The encoder stator 150 contains electric circuitry that generates an output signal indicative of the true rotary or angular position of the encoder rotor 146 relative to the encoder stator 150. As mentioned above, the rotary position of encoder rotor 146 is fixed to the rotary position of the encoder rotor hub 148 which in turn is fixed to the rotary position of the second housing assembly 104 and end effector 106. The encoder stator 150 is fixed to the first housing segment 102. Therefore, the output signal of the encoder stator 150 is also indicative of the true rotary position of the second housing segment 104 relative to the first housing segment 102.

The manipulator module 100 is sealed to inhibit the ingress of dust and moisture into the first 102 and second 104 housing segments. The main points at which there is a risk of dust and moisture entering the manipulator module is around the opening in the distal end 104b of the second housing segment 104 through which the piston rod 121 passes and at the joint between the first 102 and second 104 housing segments where the second housing segment 104 is rotating relative to the first housing segment 102. Accordingly, a wiper seal 152 is arranged around the opening in the distal end 104b of the second housing segment 104 through which the piston rod 121 passes. A rod seal 154 is also arranged around the opening in the distal end 104b of the second housing segment 104 through which the piston rod 121 passes at a point along proximal to the wiper seal 152. A rotary seal 156 is also arranged at the joint between the first 102 and second 104 housing segments. The interiors of the first 102 and second 104 housing segments are also filled with oil to further inhibit the ingress of moisture.

It is inherent in the design of the manipulator module 100 of the present invention that when the end effector 106 and second housing segment 104 are rotated whilst the first electric motor 110 is static, the screw shaft 120 of the linear actuator 118 will be rotated relative to the nut 122 causing unwanted linear movement of the linear actuator and hence unwanted movement of the end effector 106 position. However, the manipulator module 100 comprises a linear position sensor 130 and a controller (not shown) to automatically compensate for this unwanted linear movement. The linear position sensor 130 can accurately feedback the absolute linear or axial position of the linear actuator 118. The controller comprises electric circuitry for controlling the first 110 and second 112 electric motors and can drive the first electric motor 110 when the second electric motor 112 is being driven to maintain the linear actuator 118 in the correct position. The controller can operate in two modes, position control and current limiting control.

In position control mode, if an operator or a computer requests that the jaws 108 of the end effector 106 move to a particular opening position, the controller will activate the first electric motor 110 at a predefined speed to drive the linear actuator 118 until the feedback signal from the linear position sensor 130 corresponds to the requested position. The controller will maintain the linear actuator 118 in the requested position until a new request is received or a predetermined current limit is exceeded. Here, the term "current limit" refers to a maximum electrical current that should be delivered to the motor for a given operation. The electrical current supplied to the motor directly corresponds to the gripping force of the jaws of the end effector. In position control mode, the first electric motor may exceed a current limit if, for example, an obstacle is preventing the end effector from moving to a particular opening position causing the controller to increase the current delivered to the motor to try to overcome the obstacle.

If the second electric motor 112 is activated to rotate the second housing segment 104 and end effector 106 at the same time as the linear actuator 118 is being maintained in the requested position, the controller will drive the first electric motor 110 to automatically compensate for the relative rotation of the screw shaft 120 and nut 122 such that the feedback value from the linear position sensor 130 is maintained. This will maintain the jaws 108 in the requested opening position.

In current limit mode, if an operator or a computer requires an object to be picked up and manipulated, the jaws 108 of the end effector must apply a constant force to the object to maintain a grip. Therefore, the controller will drive the first electric motor 110 in the gripping direction until a predefined motor current limit is achieved. As mentioned above, the current supplied to the first electric motor 110 directly corresponds to the gripping force at the jaws 108. With the object gripped in the jaws the first electric motor 110 is in a stalled condition with a constant current draw. If the second electric motor 112 is activated to rotate the second housing segment 104 and end effector 106 at the same time as the first electric motor is being maintained at a predefined motor current limit, the controller will drive the first electric motor 110 at the same speed as the second housing segment 104, either in the same direction or against the direction of the gripper motor torque as appropriate, to maintain the predefined motor current limit in the gripping direction regardless of any relative rotation of the screw shaft 120 and nut 122, thereby maintaining a constant jaw gripping force.

Figure 4:
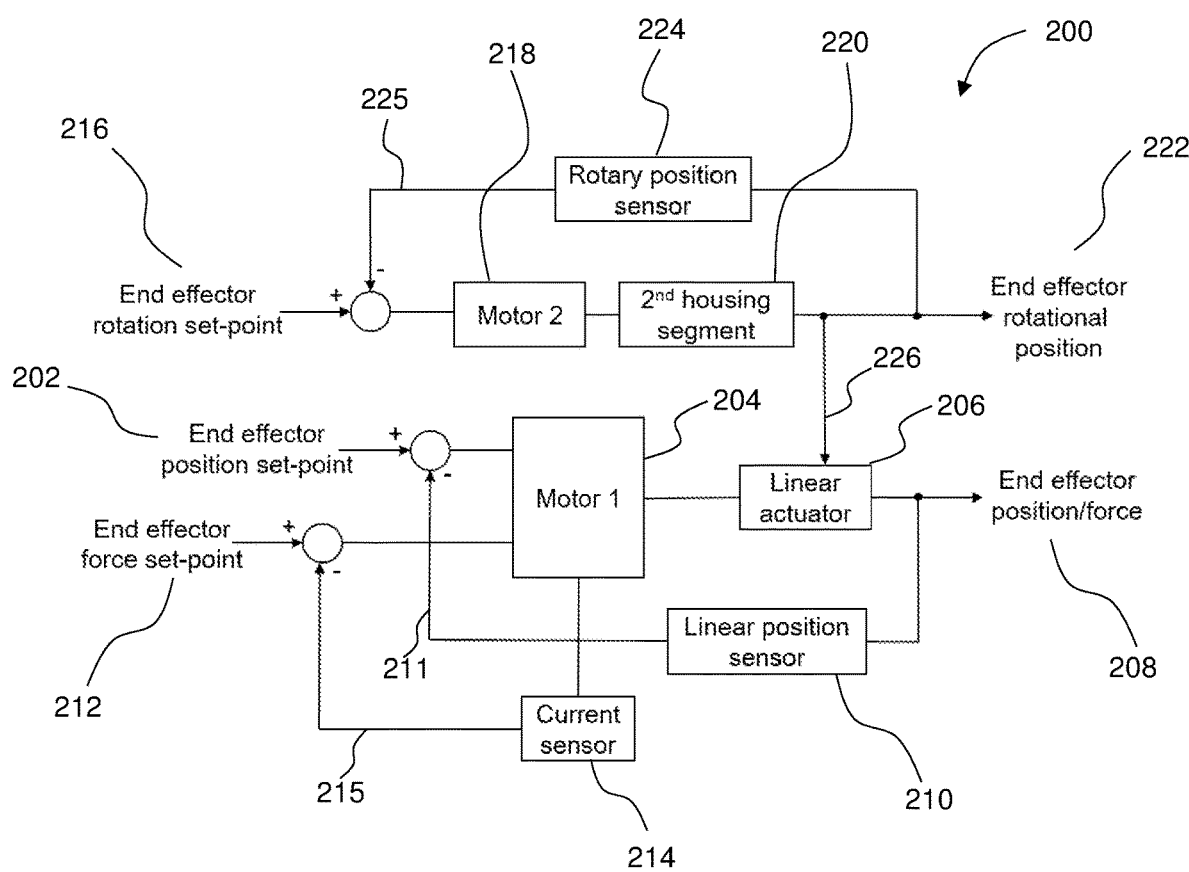
FIG. 4 is a process control diagram showing a control process for controlling end effector rotation, end effector positioning and end effector force in a manipulator module according to an embodiment of the present invention.

FIG. 4 is a process control diagram showing a control process 200 for controlling the end effector position, end effector force and end effector rotation of a manipulator module. The control process is also configured to automatically compensate for unwanted linear movement of the linear actuator, which as discussed above, is caused by the end effector and second housing segment being rotated whilst the first electric motor is static. The control process 200 can be implemented by a controller (not shown) of the manipulator module. In the control process 200 of FIG. 4, blocks are used to denote elements or components of the manipulator module, lines entering or leaving blocks or joining two blocks denote signals or a connection between components, arrows denote the direction of signal flow and circles denote summing points where input signals are added or subtracted.

The control process 200 comprises three inputs that may be provided by an operator or a computer. A first input comprises an end effector position set-point 202 which corresponds to a desired opening position of the jaws of the end effector. When an end effector position set-point 202 is provided as an input to the controller, a signal is passed to the first electric motor 204 to activate the first electric motor 204, which, in turn, drives the linear actuator 206 to move the end effector to produce an output end effector position 208. The output end effector position 208 corresponds to the actual opening position of the jaws of the end effector at any particular point in time.

The linear position sensor 210 of the manipulator module monitors the linear position of the linear actuator 206 and provides a feedback signal 211 back to the controller, which feedback signal 211 is indicative of the linear position of the linear actuator 206. The first electric motor 204 continues to drive the linear actuator 206 until the error signal, that is, the difference, between the input end effector position set-point 202 and the feedback signal 211 from the linear position sensor 210 equals zero, indicating that the output end effector position 208 is at the desired position.

A second input comprises an end effector force set-point 212 which corresponds to a constant force to be applied by the end effector to grip an object. When an end effector force set-point 212 is provided as an input to the controller, a signal is passed to the first electric motor 204 to activate the first electric motor 204, which, in turn, drives the linear actuator 206 to move the end effector to produce an output end effector force 208. The output end effector force 208 corresponds to the actual force being provided by the end effector at any particular point in time.

A current sensor 214 monitors the electrical current being supplied to the first electric motor 204 and provides a feedback signal 215 back to the controller, which feedback signal 215 is indicative of the gripping force being applied by the end effector. The first electric motor 204 continues to drive the linear actuator 206 until the error signal, that is, the difference, between the input end effector force set-point 212 and the feedback signal 215 from the current sensor 214 equals zero, indicating that the output end effector force 208 is applying the desired force.

A third input comprises an end effector rotation set-point 216 which corresponds to a desired rotational position of the second housing segment and end effector. When an end rotation set-point 216 is provided as an input to the controller, a signal is passed to the second electric motor 218 to activate the second electric motor 218, which, in turn, drives the second housing segment 220 to move the end effector to produce an output end effector rotational position 222. The output end effector rotational positional 222 corresponds to the actual rotational position of the second housing segment and end effector at any particular point in time.

A rotary position sensor 224 monitors the rotational position of the second housing segment 220 and provides a feedback signal 225 back to the controller, which feedback signal 225 is indicative of the rotational position of the second housing segment and end effector. The second electric motor 218 continues to drive the second housing segment 220 until the error signal, that is, the difference, between the input end effector rotation set-point 216 and the feedback signal 225 from the rotary position sensor 224 equals zero, indicating that the output end rotational position 208 is at the desired position.

As discussed above, it is inherent in the design of the manipulator module of the present invention that, if the end effector and second housing segment 220 are rotated whilst the first electric motor 204 is static, then unwanted linear movement of the linear actuator 206 will occur and hence there will be unwanted movement of the end effector position. The effect of rotating the end effector and second housing segment 220 on the linear actuator 206 is denoted by arrow 226 in FIG. 4.

The above description mentions that the controller of the manipulator module can operate in two modes, position control and current limiting control. The following describes how these two modes operate with reference to FIG. 4.

In position control mode, if the second electric motor 218 is activated to rotate the second housing segment 220 and end effector whilst trying to maintain the output end effector position 208 at the input end effector position set-point 202, then the linear position sensor 210 will detect any unwanted linear movement of the linear actuator 206 and will provide a feedback signal 211 back to the controller, which feedback signal 211 is indicative of the unwanted linear movement of the linear actuator 206. Responsive to the feedback signal from the linear position sensor 210, the controller will activate the first electric motor 204 to drive the linear actuator 206 until the error signal between the input end effector position set-point 202 and the feedback signal 211 from the linear position sensor 210 again equals zero in order to maintain the output end effector position 208 in the desired position. The controller is able to activate the first electric motor 204 at the same time as the second electric motor is being activated so that no noticeable change in the output end effector position 208 occurs. The controller is therefore able to compensate for the relative rotation of the second housing segment 220.

In current limit mode, if the second electric motor 218 is activated to rotate the second housing segment 220 and end effector whilst trying to maintain the output end effector force 208 at the input end effector force set-point 212, then the current sensor 214 will detect any change in the electrical current being supplied to the first electric motor 204 due to unwanted linear movement of the linear actuator 206 and will provide a feedback signal 215 back to the controller, which feedback signal 215 is indicative of the change in the gripping force being applied by the end effector. Responsive to the feedback signal from the current sensor 214, the controller will activate the first electric motor 204 at the same speed as the second housing segment 104, either in the same direction or against the direction of the end effector motor torque as appropriate, until the error signal between the input end effector force set-point 212 and the feedback signal 215 from the current sensor 214 again equals zero in order to maintain the output end effector force 208 in the gripping direction, thereby maintaining a constant end effector gripping force. The controller is able to activate the first electric motor 204 at the same time as the second electric motor is being activated so that no noticeable change in the output end effector force 208 occurs. The controller is therefore able to compensate for the relative rotation of the second housing segment 220.

The invention claimed is:

1. A manipulator module comprising:
a first housing segment configured to be connected to a manipulator;
a second housing segment rotatably coupled to a distal end of the first housing segment such that the second housing segment can rotate about a longitudinal axis relative to the first housing segment;
a linear actuator, wherein a distal end of the linear actuator is configured to be coupled to an end effector;
a first electric motor arranged to drive the linear actuator to actuate the end effector;
a second electric motor arranged to rotatably drive the second housing segment relative to the first housing segment; and
a controller configured to control a supply of electrical power from a power source to the first and second electric motors;
wherein the linear actuator is arranged to extend from the first housing segment and through the second housing segment; and
wherein the controller is configured to activate the first electric motor to automatically compensate for linear movement of the linear actuator caused by rotation of the second housing segment relative to the first housing segment.

2. The manipulator module according to claim 1, wherein the linear actuator extends along a central longitudinal axis of the first and second housing segments.

3. The manipulator module according to claim 1, wherein the second electric motor is an annular electric motor and the linear actuator extends through a central opening in the second electric motor.

4. The manipulator module according to claim 1, wherein the first and second electric motors are located within the first housing segment.

5. The manipulator module according to claim 1, wherein the linear actuator comprises a screw shaft and a nut which receives and drives the screw shaft, and wherein a distal end of the screw shaft is configured to be coupled to the end effector.

6. The manipulator module according to claim 1, wherein the manipulator module is configured such that the linear actuator is able to fully actuate an end effector with a length of travel of the linear actuator of less than 50 millimetres.

7. The manipulator module according to claim 1, wherein a proximal end of the linear actuator is contained within the first housing segment and does not travel beyond a proximal end of the first housing segment.

8. The manipulator module according to claim 1, further comprising thrust bearings arranged to support an axial load imparted by the linear actuator, the thrust bearings are located within the second housing segment.

9. The manipulator module according to claim 8, wherein the thrust bearings are arranged circumferentially around and adjacent to the linear actuator.

10. The manipulator module according to claim 1, further comprising a rotary position sensor for determining the rotary position of the second housing segment relative to the first housing segment.

11. The manipulator module according to claim 1, further comprising a linear position sensor for determining the linear position of the linear actuator, wherein the controller is configured to activate the first electric motor in response to a signal received from the linear position sensor.

12. The manipulator module according to claim 1, wherein the controller is configured to drive the first electric motor at the same time as the second housing segment is being rotated to maintain the linear actuator in a constant linear position.

13. The manipulator module according to claim 1, wherein the controller is configured to drive the first electric motor at the same time as the second housing segment is being rotated so that the controller can maintain the electrical current being delivered to the first electric motor at a predefined current limit.

14. The manipulator module according to claim 13, further comprising a current sensor for determining the electrical current being delivered to the first electric motor, the controller being configured to drive the first electric motor in response to a feedback signal received from the current sensor.

15. The manipulator module according to claim 1, further comprising an electromagnetic brake arranged to resist rotation of the second housing segment when electrical power is not being supplied to the manipulator module.

16. The manipulator module according to claim 1, further comprising a gear system for transmitting rotational movement between the second electric motor and the second housing segment, wherein the gear system comprises a strain wave gear system.

17. A manipulator comprising:
   at least one moveable linkage;
   the manipulator module according to claim 1, the manipulator module being connected to the moveable linkage; and
   an end effector, the end effector being connected to a distal end of the second housing segment of the manipulator module such that the end effector is rotated with the second housing segment.

18. The manipulator according to claim 17, wherein the end effector is releasably coupled to the linear actuator of the manipulator module by a single fastener.

19. A remotely operated vehicle comprising the manipulator module according to claim 1.

* * * * *